United States Patent [19]

Schmidt

[11] 4,347,272

[45] Aug. 31, 1982

[54] FLEXIBLE COMPOSITION OF CORK AND SHEET STRUCTURES MADE THEREFROM

[76] Inventor: Donald H. Schmidt, 14745 Major Ave., Oak Forest, Ill. 60452

[21] Appl. No.: 209,415

[22] Filed: Nov. 24, 1980

Related U.S. Application Data

[63] Continuation-in-part of Ser. No. 167,697, Jul. 11, 1980, abandoned.

[51] Int. Cl.³ .............. A61F 13/02; B32B 23/00; B32B 9/04; B28B 3/00
[52] U.S. Cl. .................. 428/40; 264/319; 264/348; 428/220; 428/326; 428/332; 428/337; 428/455
[58] Field of Search ............. 428/455, 220, 326, 332, 428/40, 337; 273/75, 63 A, 81 R; 264/319, 348

[56] References Cited

U.S. PATENT DOCUMENTS

| | | | |
|---|---|---|---|
| 2,560,420 | 7/1951 | Dodge | 428/455 |
| 3,110,615 | 11/1963 | Keel | 428/455 X |
| 3,271,031 | 9/1966 | Mitchell | 273/63 A |

FOREIGN PATENT DOCUMENTS 7909 of 1909 United Kingdom ............. 273/81 R

Primary Examiner—Thomas J. Herbert, Jr.
Attorney, Agent, or Firm—Garrettson Ellis

[57] ABSTRACT

A flexible composition comprises an intimate mixture of cork granules with a liquid organic polyol plasticizer for the cork in the granules, with the cork granules being dispersed and bonded together with a flexible, plasticized polyvinyl chloride resin.

17 Claims, 5 Drawing Figures

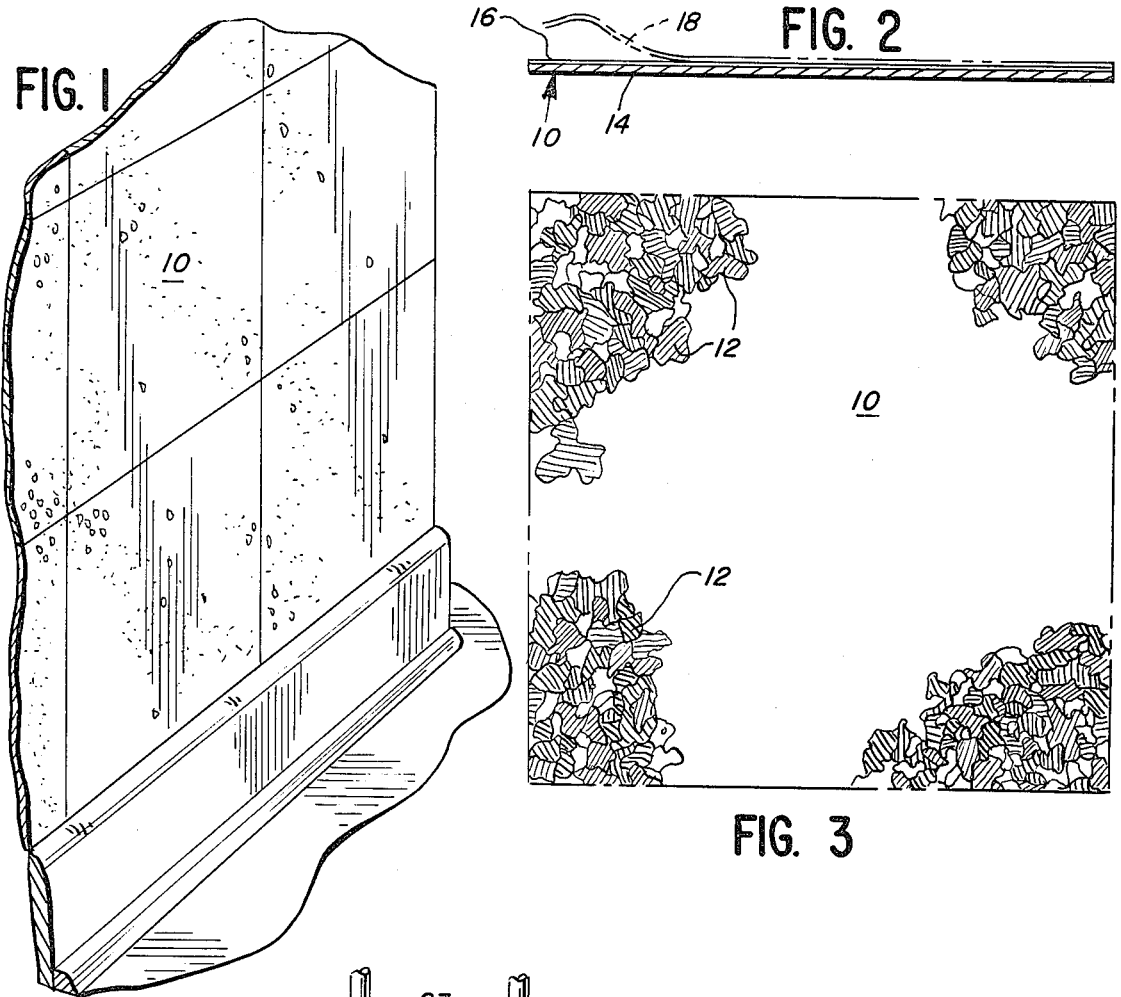
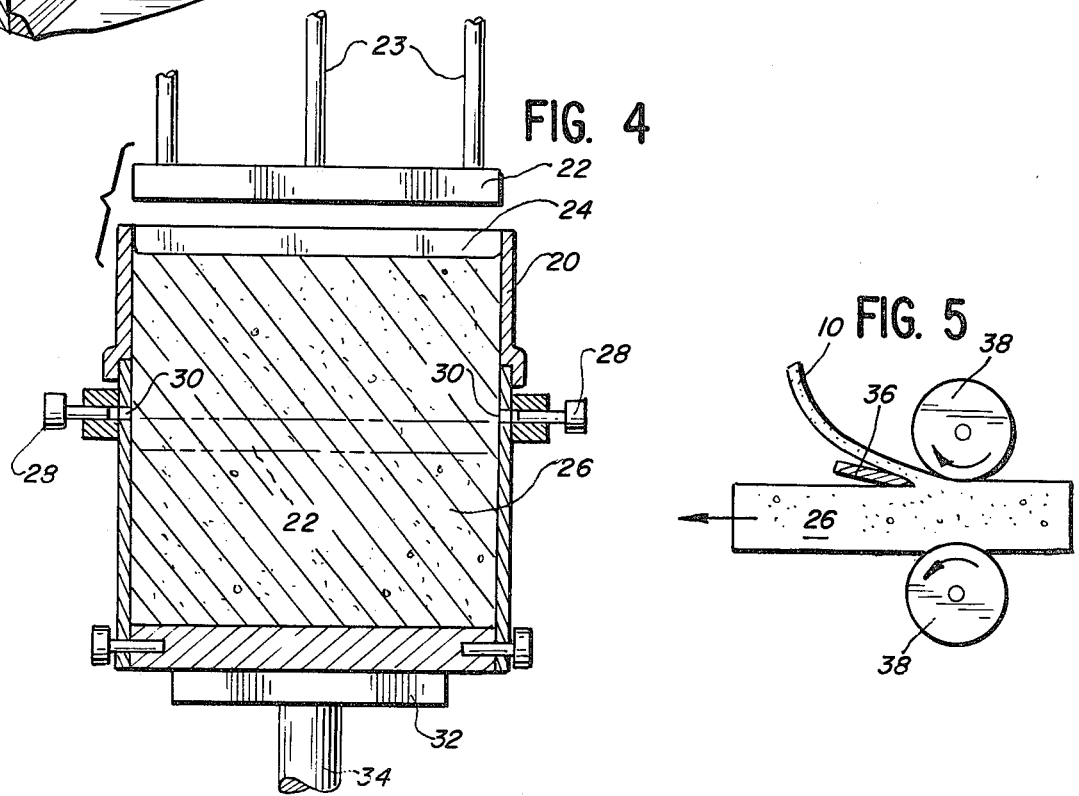

4,347,272

FLEXIBLE COMPOSITION OF CORK AND SHEET STRUCTURES MADE THEREFROM

CROSS-REFERENCE TO RELATED APPLICATION

This application is a continuation-in-part of U.S. application Ser. No. 167,697, filed July 11, 1980 and entitled "FLEXIBLE CORK HANDLE-WRAPPING STRIP," now abandoned.

BACKGROUND OF THE INVENTION

Structural materials containing cork granules are well known, with the majority of said materials being rigid cork composition materials for bulletin boards, wall tile, or the like. However, it has been known to make a flexible cork composition by filling a polyvinyl chloride resin material with cork granules, so that the resin holds the granules together in a flexible structure.

However, the cork granules remain or become dry and brittle, so that the resulting product is only slightly flexible without resulting in breakage of the cork granules, even though the vinyl binder material itself is flexible.

Other compositions made of cork granules constitute a mixture of gelatin glue and glycerine as a plasticizer for the cork, to soften it, plus water. This composition, after formation, tends to dry out due to slow loss of the glycerine from the cork, resulting in shrinkage of the composition.

By this invention, a formulation is provided in which the plasticizer in the cork is retained within the cork granules, and does not migrate into the binder or matrix of the composition, with the result that the loss of glycerine or other polyol-type plasticizer proceeds at a much slower rate than has been known in the prior art. Accordingly, thin sheets of the composition of this invention may be flexible, and may retain their flexibility for a long period of time due to inhibition of the loss of the glycerine or other polyol plasticizer from the cork granules by the use of the principles in accordance with this invention.

DESCRIPTION OF THE INVENTION

In accordance with this invention, a flexible composition is provided which comprises 20 parts by weight of cork granules (based on dry cork), the granules also containing from 1 to 10 parts by weight of a liquid organic polyol plasticizer for the cork. The cork granules are dispersed and bonded together in a matrix of 4 to 60 parts by weight of a flexible resin which is incompatible in terms of miscibility with the polyol plasticizer. Preferably, the resin is plasticized polyvinyl chloride.

Because the liquid organic polyol is preferably incompatible in terms of miscibility with the matrix, the migration of the polyol plasticizer from the cork granules to the matrix is suppressed. Accordingly, the polyol does not diffuse out of the cork, but is sealed therein by the fact that the cork granules are generally surrounded by the polyvinyl chloride resin, the resin serving the double function of a matrix retaining the cork granules as a composite article, and also serving as a sealer to inhibit the diffusion or evaporation of the liquid organic polyol from the cork granules. Thus the cork granules remain soft and flexible for an extended period of time, giving the flexible composition of this invention an extended lifetime, even when it is cut into flexible sheets of high surface area of no more than ¼ inch thick.

The cork granules used herein may be predominately of a size between ⅛ and 1/18 inch. However, larger cork granules may be used, if desired, for example, for a different decorative appearance.

It is generally preferable for the polyol plasticizer to be glycerine, but other suitable materials containing a plurality of hydroxyl groups for compatibility with the cork may be used, including diethylene glycol, propylene glycol, and higher glycol polymers such as triethylene glycol, dipropylene glycol, and copolymers of ethylene and propylene glycol.

Preferably, the molecular weight of the liquid organic polyol plasticizer is no more than about 200, so that the liquid polyol can easily flow into intimate relationship with the cork granules, rendering them flexible and reducing the natural, brittle characteristic of dry cork granules.

The polyvinyl chloride resin utilized herein is commercially available from numerous sources, and, to form a flexible binding material, must be plasticized with a known organic plasticizer for polyvinyl chloride. Many dozens of different plasticizers are known and commercially available, and, generally, any known plasticizer which forms a flexible plastic with polyvinyl chloride may be used. Good results have been achieved with the phthalate diester plasticizers, particularly butylbenzylphthalate. Other plasticizers may also be used to achieve equivalent results, for example dioctylphthalate, di-2-ethylhexyl adipate, dibutylsebacate, diisodecylphthalate, tricresylphosphate, trioctyltrimellitate, triethyleneglycol dihexanoate, and dozens of other types of known plasticizers.

Preferably, from 3 to 31 parts by weight of polyvinyl chloride resin may be present per 20 parts by weight of cork granules (dry weight) plasticized with from 1 to 25 parts by weight of a suitable organic plasticizer for polyvinyl chloride. Preferably from 3 to 8 parts by weight of polyol plasticizer may be present.

In the method of manufacturing the flexible sheets of cork granules in binder of this application, the above described proportions of ingredients may be mixed, and the mixture may be pressed in a chamber by means of a tightly-fitting plunger pressed into the mouth of the chamber to compress the mixture to a pressure of about 20 to 30 pounds per cubic foot, while heating it to about 250° to 400° F. for a period of time sufficient to cause the liquid organic polyol to be substantially all absorbed into the cork, and for the resin which makes up the matrix, preferably plasticized polyvinyl chloride, to form the mixture into a unitary mass.

Thereafter, the unitary mass is cooled to solid form and after that the compression on the composition is released. The resulting block of composition may be removed from the chamber and cut as desired into flexible sheets.

BRIEF DESCRIPTION OF THE DRAWINGS

In the drawings, FIG. 1 is a fragmentary perspective view of a wall covered with wall tile, made of the flexible composition of this invention.

FIG. 2 is a transverse sectional view of a wall tile of FIG. 2, before application to the wall.

FIG. 3 is an enlarged plan view of a wall tile of FIG. 1.

FIG. 4 illustrates a method step in the process of this invention for manufacturing the composition disclosed herein, with portions thereof taken in vertical section.

FIG. 5 is a schematic view showing a subsequent step in the method of manufacturing flexible sheets made in the composition of this invention.

Referring to the drawings, wall tiles 10 are, as shown in FIG. 3, made of a mass of cork granules 12 dispersed and bonded together in a matrix of polyvinyl chloride resin as described herein. The cork granules, of course, extend over the entire face of the tile 10 as shown in FIG. 3, with some cork granules being omitted for purposes of drafting convenience from some of the surface of the tile.

Referring to FIG. 2, wall tile 10 is shown having a first layer 14 made of the cork composition of this invention, and overlaid with a second layer 16 of any desired pressure sensitive adhesive. After the adhesive application step, adhesive layer 16 may be overlaid with a commercially available peel-sheet layer 18, as shown, to protect the adhesive until time of use.

Such a construction of material 10 may not only be used for wall tiles, but, since it is flexible, it may be used to cover curved surfaces such as lamp bases, waste baskets, drinking glasses or cups to insulate them, or any other desired use of the sheet-like structure 10 of this invention. In the previously cited patent application, strips of the described sheet-like structure are taught to be utilizable for wrapping the handles of tennis racquets, baseball bats, and the like, making use of the flexibility of the composite structure, coupled with its characteristic of retaining the plasticizer for the cork in the cork granules, contrary to prior art compositions. The material remains flexible and soft since the cork granules do not dry out by losing their plasticizer at a rate which is anywhere nearly as fast as in the compositions of the prior art.

By way of example, the composition of this invention may be made in the following manner, or in a manner analogous to that which is described below:

Eighty pounds of plasticized polyvinyl chloride granules (Geon 121 sold by B. F. Goodrich, Inc.) and 10 pounds of glycerine were mixed together to form a relatively homogeneous mixture, although the ingredients are not compatible.

Sixty pounds of the above mixture were then added to 40 pounds of #8/18 ground dry cork. The preceding number implies that the ground cork is of a particle size which can pass through a Tyler-mesh screen with 8×8 holes per inch, but cannot pass through a Tyler-mesh screen with 18×18 holes per inch.

After the above composite mixture is well mixed, 50 pounds of the mixture are placed in hollow steel block 20 (FIG. 4), having a chamber of the dimensions 24½×36½×3½ inches. A tightly fitting plunger 22 is placed into the mouth 24 of the above hollow steel block, removably fixed by rods 23 to a stationary surface, and pressed inwardly by raising block 20 by hydraulic piston 34 and platen 32, to compress the composite mixture 26 within the hollow block to a pressure of about 27 pounds per cubic foot.

Plunger 22 may then be locked in its advanced, compressing position as shown in phantom lines, by means of sliding pins 28, which can penetrate apertures 30 of hollow steel block 20 to retain plunger 22 at its predetermined advanced position, to maintain the desired pressure.

Then, the hollow steel block 20 and attached plunger 22 may be placed in a gas-fired oven for 4 hours at 300° F., to melt the polyvinyl chloride plastic granules so that they flow about the cork granules into intimately adhering relationship, to produce a unitary, composite article out of the contents of hollow steel block 20.

During this period of time, the glycerine, which is incompatible in terms of the miscibility with the plasticized polyvinyl chloride, is substantially all absorbed into the cork to soften it, the absorption being enhanced by the incompatibility of the glycerine with the plasticized polyvinyl chloride, as well as the pressure. Also it has been noted that the process of the absorption of glycerine by the cork, when the glycerine has been mixed with the polyvinyl chloride plastic granules, appears to provide an improved bond of the polyvinyl chloride plastic with the cork, with portions of the polyvinyl chloride plastic entering into interstices of the cork for good retention thereto.

Because of the incompatibility of the glycerine with the plasticized polyvinyl chloride, the glycerine also tends to be retained in the cork and not migrate out, so that the cork does not readily dry out, even when the composition of this invention is cut into thin slabs so that there is a relatively high surface area.

This provides a significant advantage over certain other known particular cork formulations made, for example, of gelatin glue where the cork is plasticized with glycerine. Because gelatine glue is compatible with glycerine in terms of miscibility, the glycerine can migrate out of the cork into the glue, causing the cork to dry out, to become brittle, and to shrink. Thus the use of an incompatible resin causes the polyol plasticizer for cork to remain in the cork with less outward migration, so that the cork remains resilient.

After the four-hour heating stage, the steel block is allowed to cool to about room temperature, and then opened. The cork composition block is then removed. It is desirable to cool the cork composition to about 30° C. or below prior to removing the pressure, so that the cork composition retains much of its compressed state even after removal from the block.

The block of cork composition may be then sliced into sheets of the desired thickness by use of a commercial slicing machine. For example, a desirable thickness of the first layer of this invention may be 0.03 to 0.1 inch, and preferably about 0.06 inch. The sheets of cork may then be coated on one side with the desired pressure-sensitive adhesive layer 16, for example MACTAC 1160 of the Morgan Adhesive Company, or any other suitable adhesive which is preferably strongly adhesive to the vinyl resin material.

Rollers 38 of the commercial slicing machine advance the block of composite cork material 26 formed previously against a blade 36, which cuts away the desired thin sheet 10 of the material of this invention. The remaining portion of cork block 26 may then be recycled through the machine, until it has been sliced in the desired manner into the separate thin sheets preferably no more than ¼ inch thick.

Thereafter the adhesive layer 16 may be overlaid with a commercially available peel-sheet layer 18 and cut into the desired shape, for example squares for use as wall tile or general covering members, being quite desirable for hobby and craft use because of the flexibility of the cork product of this invention.

Also, as described in the previous application, the sheets of composition of this invention may be sliced into strips and used for wrapping the handles of tennis racquets, baseball bats, fishing rods, and the like.

It is of note that the pressure-adhesive layer 16 may be primarily bonded to the vinyl binder, so that if the pressure-sensitive adhesive is not very compatible with the cork, the system can work effectively, since the cork granules are generally encapsulated to the vinyl binder.

The above has been offered for illustrative purposes only, and is not intended to limit the invention of this application, which is as defined in the claims below.

That which is claimed is:

1. A flexible composition which comprises 20 parts by weight of cork granules, said granules containing from 1 to 10 parts by weight of a liquid organic polyol plasticizer for the cork, said cork granules being dispersed and bonded together in a matrix of 4 to 60 parts by weight of flexible plasticized polyvinyl chloride resin, the flexible composition being in the form of a flexible sheet.

2. The composition of claim 1 which is no more than ¼ inch thick.

3. The composition of claim 1 in which said liquid organic polyol is incompatible in terms of miscibility with said matrix, to suppress migration of the polyol from the cork granules to the matrix.

4. The composition of claim 1 in which said cork granules are predominately of a size between ⅛ and 1/18 inch.

5. The composition of claim 1 in which said polyvinyl chloride resin is plasticized with a phthalate diester material.

6. The composition of claim 1 in which said polyol plasticizer is glycerine.

7. A flexible composition which comprises an intimate mixture of 20 parts by weight of cork granules, said granules containing from 1 to 10 parts by weight of glycerine plasticizer for the cork, said cork granules being dispersed and bonded together in a matrix of 4 to 60 parts by weight of flexible, plasticized polyvinyl chloride resin, said liquid organic polyol being incompatible in terms of miscibility with said matrix to suppress migration of the polyol from the cork granules to the matrix, the flexible composition being in the form of a flexible sheet no more than ¼ inch thick.

8. The composition of claim 7 in which said polyvinyl chloride resin is plasticized with a phthalate diester material.

9. A flexible sheet which comprises an intimate mixture of 20 parts by weight of cork granules, said granules containing from 1 to 10 parts by weight of a liquid organic polyol plasticizer for the cork, said cork granules being dispersed and bonded together in a matrix of 4 to 60 parts by weight of a flexible, plasticized polyvinyl chloride resin, said flexible sheet being no more than ¼ inch and carrying on one side thereof a second layer of contact adhesive and a third, peel-sheet layer overlying the contact adhesive layer for peeling away to expose the contact adhesive layer for use.

10. The flexible sheet of claim 9 in which said liquid organic polyol is incompatible in terms of miscibility with said matrix, to suppress migration of the polyol from the cork granules to the matrix.

11. The composition of claim 9 in which said polyvinyl chloride resin is plasticized with a phthalate diester material.

12. The flexible sheet of claim 9 in which said polyol plasticizer is glycerine.

13. The flexible sheet of claim 12 in which said cork granules are predominately of a size between ⅛ and 1/18 inch.

14. The method of manufacturing flexible sheets of cork granules and binder which comprises mixing 4 to 60 parts by weight of plastic matrix-forming resin with 1 to 10 parts by weight of a liquid organic polyol plasticizer for the cork, said resin being incompatible with said polyol plasticizer; adding to said mixture essentially 20 parts by weight of cork granules; pressing said mixture in a chamber by means of a tightly-fitting plunger pressed into the mouth of said chamber to compress the mixture to a pressure of about 20 to 30 pounds per cubic foot, while heating said mixture to about 250° to 400° F. for a period of time sufficient to cause the liquid organic polyol to be substantially all absorbed into the cork, and for the resin to form the mixture into a unitary mass, and thereafter cooling said composition to solid form, releasing the compression on said composition, removing the resulting block of said composition, and cutting said composition into flexible sheets.

15. The method of claim 14 in which said plastic matrix-forming resin is plasticized polyvinyl chloride.

16. The method of claim 15 in which said polyol plasticizer is glycerine.

17. The method of claim 16 in which the polyvinyl chloride resin and plasticizer is previously plasticized prior to the mixing and heating step.

* * * * *